UNITED STATES PATENT OFFICE.

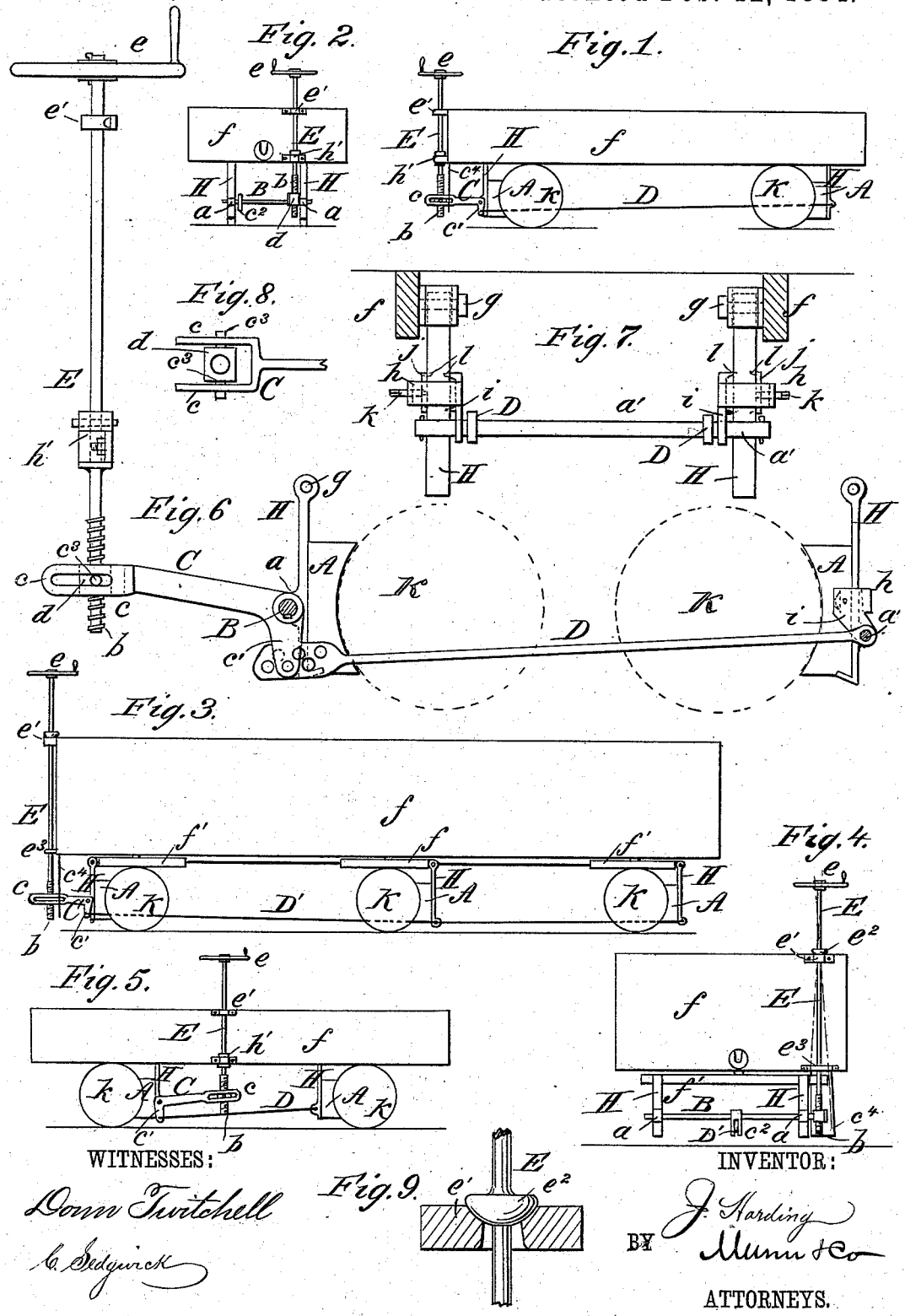

JOSIAH HARDING, OF ANTOFAGASTA, CHILI.

CAR-BRAKE.

SPECIFICATION forming part of Letters Patent No. 293,455, dated February 12, 1884.

Application filed December 19, 1883. (No model.)

*To all whom it may concern:*

Be it known that I, JOSIAH HARDING, of Antofagasta, Chili, have invented a new and Improved Car-Brake, of which the following is a full, clear, and exact description.

My invention relates to that class of car-brakes in which a screw-staff is connected to the elbow-lever by a swiveled bearing, said lever being connected by its long and short arms to the front and rear brakes of the car; and the invention consists in the construction and arrangement of parts, as will be hereinafter fully described and claimed.

Reference is to be had to the accompanying drawings, forming part of this specification, in which similar letters of reference indicate corresponding parts in all the figures.

Figure 1 is a side elevation of a four-wheel car with rigid wheel-base to which my improved brake is applied. Fig. 2 is an end elevation of the car represented in Fig. 1. Fig. 3 is a side elevation of a car having pivoted trucks with my improved brake applied to it. Fig. 4 is an end elevation of a car mounted on trucks and having my improved brake applied to it. Fig. 5 is a side elevation of a car with my improved brake applied, and having the brake-staff located on the side of the car between the wheels, the brakes also being between the wheels. Fig. 6 is a side view of the brake mechanism, showing details of construction. Fig. 7 is an end view of some of the mechanism shown in Fig. 6. Fig. 8 is a plan view of details, and Fig. 9 is a detail of the brake-staff as arranged for cars mounted on trucks or flexible wheel-bases.

I propose to form a screw, $b$, on the lower portion of the brake-staff E, and fit it in a nut, $d$, having trunnions $c^3$, by which it is connected to the slotted cheeks $c$ of an elbow-lever, C, pivoted on a shaft, B, having bearings in eyes $a$ of hangers H, suspended from the car-body $f$ by pivots $g$ when the wheel-base is rigidly attached to the body, and from the truck $f'$, when trucks are used.

The hangers H, to which the shaft B is pivoted, carry the brake-shoes A for the wheels K of that end of the car to which the brake-gear is applied. Other similar hangers carry the shoes A for the other end of the car, and for intermediate wheels, when the brake is to be applied to cars having more than four wheels. The lever C has a short arm, $c'$, extending downward at a right angle to the main arm, or thereabout, and has a tension-rod, D, connected to it, which also connects with the bar $a'$ of the hind brakes A, and of intermediate brakes when used as in Fig. 3. When only one tension-bar D, is employed said rod will be located at the middle of the car, as in Fig. 4, and will connect with a short arm, $c^2$, keyed on the shaft B. The lever C in that case will not require to have the arm $c'$; but when two tension-rods are used it is preferred to construct said lever with the short arm $c'$ to serve for connecting with one of the tension-rods; but in that case a separate short arm may be used, the lever C, and also the short arm or arms, being keyed to the shaft B. It will be seen that when the lever C is raised by the brake-staff screw the pull of the arm $c'$ or arms $c'$ and $c^2$ on the tension rod or rods D, drawing the hind brakes on the wheels, will react on the front brakes through the shaft B, which is the fulcrum of lever C, and thus the brakes of both ends of the car will be applied, also intermediate brakes, if any are used. The object of connecting the brake-staff nut $d$ to the lever C by slotted holes for the pivots of said nut is to allow the necessary freedom for forward and backward motion of the lever by the swing of the hangers and the shakes and thrusts of the car on the brake-staff supported by bearings $e'$ and thrust-bearing $h'$, attached to the end of the car; but when the car is mounted on trucks the thrust-bearing $h'$ is to be dispensed with, and the brake-staff is to be suspended by an oval collar, $e^2$, from the upper bearing, $e'$, so that the lower end may swing with the lever C as the truck plays laterally, particularly in turning on curves. A guard, $e^3$, will preferably be used in this case, in place of the thrust-bearing $h'$.

On cars having intermediate wheels, as in Fig. 3, the intermediate brakes A will, like the hind ones, be placed back of the wheels, and in such cases it is desirable to connect the rods D as low down as possible, while in other cars it is preferred to connect them higher up. For this purpose I connect the bar $a'$, on which the tension-rods pull, to the hangers H by a clamp consisting of eye-plate $i$, band $h$, bearing-plate $j$, and the binding-screw $k$, said eye-plate and bearing-plate having stud-points $l$ to bite on the shoe, so as not to shift out of position.

In case it may be preferred to locate the brake-staff E and lever C between the wheels of one side of a car, as in Fig. 5, it may be readily done without any change in the construction, except that the thrust-bearing $h^t$ of the staff must be arranged to force the lever C downward, whereas in the other arrangement it must pull upward. The brake-staff is to be provided with the usual hand-wheel, $e$, for turning it. A suitable guard, $c^t$, is to be arranged with the lower end of the brake-staff for its protection.

It is to be noticed that the devices employed are almost identical for any form of car, which enables the hangers, screws, and other parts to be interchangeable throughout the whole of the rolling-stock of various classes of cars.

It is also to be noticed that in this improved brake the shaft B, by which the lever is made to work the brakes, also forms one of the brake-bars, and thus enables the lever device to be arranged in a very simple manner.

Having thus described my invention, what I claim as new, and desire to secure by Letters Patent, is—

1. The combination of the pivoted hangers H at one end of the car, connected near their lower ends by the transverse shafts B with the elbow-lever C, pivoted on said shaft and connected by its long arm to the screw-staff E, and by its short arm to the connecting-rod D, secured to the hangers at the opposite end of the car, substantially as set forth.

2. The combination of the pivoted hangers at one end of the car, connected near their lower ends by a shaft, B, on which is pivoted the elbow-lever C, with the rod D, provided at one end with a series of holes for adjustably connecting it with the short arm of the elbow-lever, and connected at its other end to clamps $h$, vertically adjustable on the hangers at the other end of the car, substantially as set forth.

3. The adjustable clamps $h$ on bar $a'$, consisting of the plates $i$, carrying screws $k$, the plates $j$, and the teeth $l$ on said plates $ij$, substantially as set forth.

4. In a car-brake for flexible wheel-bases, consisting of lever C and screw-staff E, connected to said brakes, as described, the staff E, suspended from the support $e'$ by an oval collar, $e^2$, as set forth.

5. The bar $a'$, for connecting the pull-rods D to the hind brakes, connected to the brakes by vertically-adjustable clamps, substantially as described.

JOSIAH HARDING.

Witnesses:
TAP SCHUMACHER,
E. M. ROSAS.